Nov. 1, 1932.                L. BRENNEIS                1,885,410
                         BEARING CONSTRUCTION
                          Filed Jan. 25, 1930
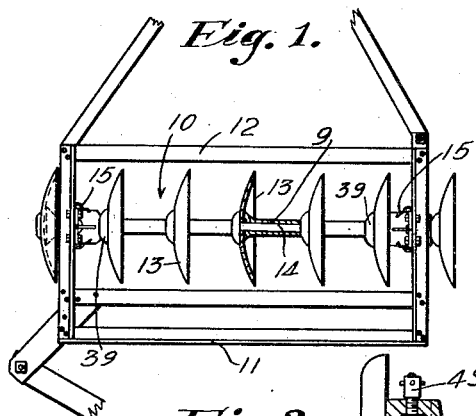
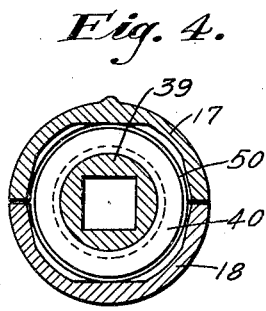
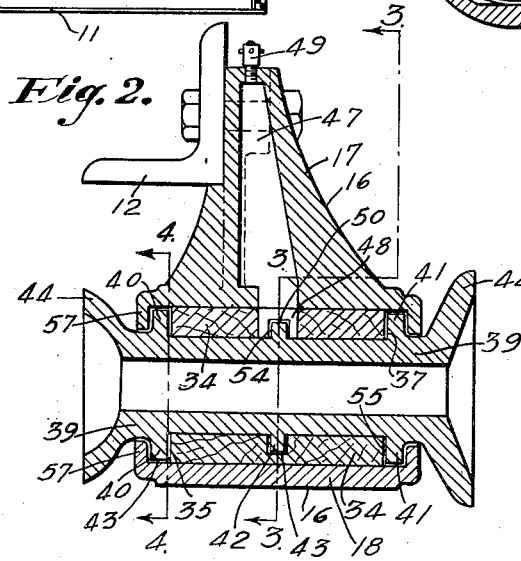
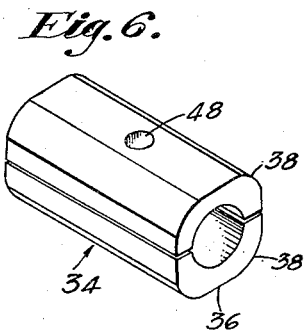
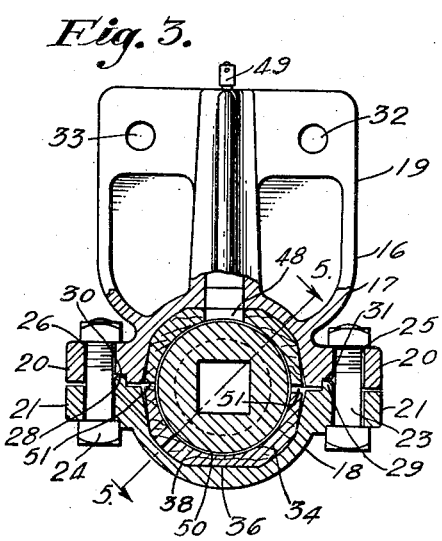
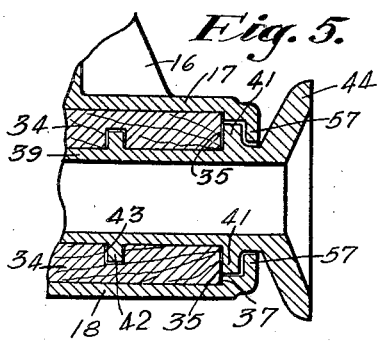
INVENTOR:
Louis Brenneis
By
ATTORNEY.

Patented Nov. 1, 1932

1,885,410

UNITED STATES PATENT OFFICE

LOUIS BRENNEIS, OF OXNARD, CALIFORNIA, ASSIGNOR TO BRENNEIS MANUFACTURING COMPANY, OF OXNARD, CALIFORNIA, A CORPORATION OF CALIFORNIA

BEARING CONSTRUCTION

Application filed January 25, 1930. Serial No. 423,298.

My invention relates to the construction of bearings suitable for use with agricultural implements and vehicles, and relates particularly to a simple form of bearing which may be readily adapted to use with a disc assembly of a disc harrow.

The disc harrow construction with which my present invention is extensively employed includes frame sections which carry disc assemblies in position for harrowing the ground surface. The frame sections are adapted for angular adjustment relative to each other so as to place the discs on the desired angle of operation, depending upon the working conditions with which the agriculturist is confronted. The relative adjustments of the frame sections are therefore many and vary with the condition of the soil to be harrowed and with the character of the plants or trees to be cultivated. In nearly every instance of the use of these harrows, the disc assemblies are supported at an angle relative to the line of forward movement of the harrow, with the result that thrust forces are always present which tend to displace the disc assemblies relative to the bearings in which they are supported. This condition, in combination with the presence of fine silt which readily works into the ordinary bearing, results in the very rapid destruction of the bearing.

It is an object of my invention to provide a simple bearing structure having a cheap and simple, replaceable journal element which does not require skill or careful adjustment in its replacement.

A further object of the invention is to provide a bearing having a positive means for feeding lubricant into the bearing space existing between the wearing faces of the bearing structure.

A further object of the invention is to provide a bearing including a replaceable journal adapted to be held in a cavity provided by a supporting bracket and a rotary part which also serves as a spacing sleeve in a harrow disc assembly. My improved bearing construction is equipped with a plurality of radially extending flanges which engage cooperating parts of the replaceable journal unit, thus causing the thrust forces of the disc assembly to be received by bearing surfaces especially adapted for such utility. In this bearing construction one of the thrust flanges also serves as a distributor for lubricant which is initially placed in a lubricant chamber formed within the body of the bearing bracket forming part of the bearing structure.

Further objects and advantages will appear throughout the following part of the specification.

Referring to the drawing which is for illustrative purposes only,

Fig. 1 is a plan view of a disc harrow section employing bearings of my invention.

Fig. 2 is a vertical sectional view taken longitudinally through the left-hand bearing of the pair of bearings shown in Fig. 1.

Fig. 3 is an elevational view of the bearing structure, partly sectioned as indicated by the line 3—3 of Fig. 2.

Fig. 4 is a vertical cross section taken on the line 4—4 of Fig. 2.

Fig. 5 is a fragmentary section taken on the line 5—5 of Fig. 3.

Fig. 6 is a perspective view of the replaceable bearing element employed in the invention.

In order to indicate the utility of a preferred form of my invention, I show in Fig. 1 a disc harrow section 11 having a rectangular frame 12 and including a disc assembly 10 consisting of a plurality of harrow discs 13 held in spaced position along a squared shaft 14 by a plurality of spacing sleeves 9. At each end of the disc assembly I employ a bearing sleeve 39 which is of such form that it serves both as a spacing sleeve in the disc assembly 10 and as a rotary bearing element of the bearings or bearing structures 15 which are secured to the frame 12 so as to hold the disc assembly 10 in the required position of operation.

The bearing 15, shown in detail in Figs. 2 to 5, includes a bearing housing 16 which may be in two parts 17 and 18 to permit assemblage. Ears 20 and 21 are formed on the parts 17 and 18, in which openings 25 and 26 are provided through which attachment bolts 23 and 24 may be passed. Provided in the lower housing 18 are lugs 28 and 29 adapted to engage recesses 30 and 31 in the upper housing 17 to insure correct assemblage. The upper half of the bearing housing 17 is provided with a projecting web 19, through the upper part of which are openings 32 and 33, so that the housing may be attached to the upper part of the frame 12 of the harrow 11 by means of bolts.

The bearing housing 16 provides an opening adapted to receive a bearing lining 34 which is preferably made of a fibrous material, such as wood, and is constructed of two partly squared semi-cylindrical sections. As is best shown in Fig. 5, formed on the ends of the bearing lining are shoulders 35 which are so constructed as to abut shoulders 37 formed on the bearing housing 16. The bearing lining is also constructed with plane surfaces 36 and curved surfaces 38 adapted to engage complementary surfaces provided for them in the bearing housing 16. It will thus be seen that this construction prevents any relative longitudinal and lateral movement between the disc assembly and the bearing housing.

Adapted to be journaled by the bearing lining 34 is a bearing sleeve 39 which is provided with thrust flanges 40 and 41 which are designed to rotate in the channels provided for them between the formed ends 35 of the bearing lining and the sides of the bearing housing 16. Intermediate the thrust flanges 40 and 41 is provided a somewhat smaller central thrust flange 42 which is designed to rotate in a channel 43 formed in the bearing lining 34. This thrust flange 42 is adapted to assist in lubricating the bearing surface in that it picks up the rather viscous lubricant which may be contained in the lower part of the channel 43, and carries it to the bearing surface. The central flange 42 also causes the fibrous material 34 to become permeated with the lubricant by forcing the lubricant in through the sides of the walls of the channel 43. The outer flanges act in a similar capacity but to a smaller degree. The outer ends of the member 39 terminate in bell shaped flanges, which cooperate with the spacing sleeves 9, for terminating the disc 13.

As will be plainly evident from the drawing, the upper portion or body 17 of the bearing housing 16 is formed with a large lubricant chamber 47 having an opening at its lower end aligned with an opening 48 in the upper cooperating half or section of the bearing lining or replaceable journal 34. It will be noted that the opening 48 communicates with the central annular channel or groove 43 in which the radial flange 42 of the sleeve 39 is received, but it will be noted that the diameter of the groove 43 is greater than the diameter of the flange 42 so that an annular space 50 is formed in the groove 43 and adjacent to the circumferential face of the flange 42. Through a fitting 49, the chamber 47 receives a lubricant, such as a viscous grease, this grease entering the opening 48 and engaging that portion of the flange 42 which extends across the opening 48. Rotation of the rotary part or sleeve 39 of the bearing structure results in the flange 42 carrying the lubricant into the space 50 within the channel 43. A portion of this grease flows laterally through the spaces 51 between the cooperating lips or edges of the upper and lower portions of the replaceable journal 34, thus causing the lubricant to be carried down the length of the rotary bearing part or sleeve 39 and to the end flanges 40 and 41 so as to lubricate these end flanges and to fill the annular spaces existing around them in the bearing housing.

In the practical construction of the replaceable journal or lining 34, a degree of working clearance between the radial faces of the member 39 and the radial faces of the journal 34 is provided, as indicated at 54 and 55, the result being that the sleeve 39 has a small axial movement within the journal 34 so that the slight axial reciprocation of the sleeve 39 during the use of the harrow will cause lubricant to move through the radial spaces of the bearing into the cylindrical spaces thereof, whereby to assure ample lubrication of these working parts. It will be noted that the replaceable journal 34 is held in centralized position in the bearing housing 16 by the abutments or stop walls 37 which engage the end walls 35 of the journal 34. The axial movement of the journal 34 relative to the housing 16 is limited to a very small amount, with the result that the sleeve 39 is held from engagement with the metal parts of the bearing housing 16. The inwardly directed radial flanges 57 of the housing 16 cover the thrust bearing elements or flanges 41 of the sleeve 39 and protect the bearing structure from free entry of dirt and silt into the working parts thereof.

It will be noted that the housing 16 consists of two simple parts held together in operative position by a pair of bolts 23 and 24 which may be readily removed so that access to the interior space or chamber of the bearing housing may be had by the removal of the lower or cap part 18 thereof.

In view of the fact that the replaceable journal 34 is to be made of wood, it is not necessary to maintain a very close fit with the rotary part 39 of the bearing assembly. The tendency for entrance of abrasive dust into the bearing is constantly counteracted by the flow of lubricant from the relatively large lubricant chamber 47 toward the two ends of the bearing structure, this tending to remove dirt and also prevent it from entering the bearing.

I claim as my invention:

1. A bearing structure of the character described, including: a bearing housing comprising a downwardly extending body and a cap therefor, there being a lubricant chamber formed within said body and a journal receiving cavity formed between said body and said cap; a journal bearing adapted to be held in said cavity, said journal bearing having parts disposed in cylindrical relationship, an opening communicating with said lubricant chamber, and an annular groove communicating with said opening; and a rotary bearing part rotatable within said journal bearing, said part having a flange extending into said groove and being adapted to carry lubricant from said opening of said journal bearing.

2. A bearing structure of the character described, including: a bearing housing comprising a downwardly extending body and a cap therefor, there being a lubricant chamber formed within said body and a journal receiving cavity formed between said body and said cap; a longitudinally parted removable journal bearing adapted to be held in said cavity, said journal bearing having an opening communicating with said lubricant chamber and an annular groove communicating with said opening; and a rotary bearing part rotatable within said journal bearing, said part having a flange extending into said groove and being adapted to carry lubricant from said opening of said journal bearing, there being an annular channel formed between said flange and the walls of said groove through which lubricant may be carried by said flange to said journal bearing.

3. A bearing structure of the character described, including: a bearing housing comprising a downwardly extending body and a cap therefor, there being a lubricant chamber formed within said body and a journal receiving cavity formed between said body and said cap; a longitudinally parted removable journal bearing adapted to be held in said cavity, said journal bearing having an opening communicating with said lubricant chamber and an annular groove communicating with said opening; and a rotary bearing part rotatable within said journal bearing, said part having an intermediate flange extending into said annular groove and end flanges adapted to engage the ends of said journal bearing in a manner to transmit thrust loads.

4. A bearing structure of the character described, including: a bearing housing comprising a downwardly extending body and a cap therefor, there being a lubricant chamber formed within said body and a journal receiving cavity formed between said body and said cap; a longitudinally parted removable journal bearing adapted to be held in said cavity, said journal bearing having an opening communicating with said lubricant chamber and an annular groove communicating with said opening; and a rotary bearing part rotatable within said journal bearing, said part having an intermediate flange extending into said annular groove and end flanges adapted to engage the ends of said journal bearing in a manner to transmit thrust loads, there being an annular channel formed between said flange and the walls of said groove through which lubricant may be carried by said flange.

In testimony whereof, I have hereunto set my hand at Oxnard, California, this 17th day of January, 1930.

LOUIS BRENNEIS.